Aug. 26, 1952     B. E. DEL MAR ET AL     2,608,500

STRUCTURAL ELEMENT

Filed Dec. 6, 1947

INVENTOR.
BRUCE E. DEL MAR AND
PAUL L. SMITH
BY Edwin Coates
ATTORNEY

Patented Aug. 26, 1952

2,608,500

UNITED STATES PATENT OFFICE 2,608,500

STRUCTURAL ELEMENT

Bruce E. Del Mar, Los Angeles, and Paul L. Smith, Van Nuys, Calif., assignors to Douglas Aircraft Company, Inc., Santa Monica, Calif.

Application December 6, 1947, Serial No. 790,200

6 Claims. (Cl. 154—45)

This invention relates to structural elements and more particularly to such an element having a relatively low thermal transmission.

The structural element of the present invention, in the broadest aspects thereof, comprises a panel formed as a laminate consisting of a pair of thin gauge skins separated by a low density stabilizing core, the opposite surfaces of which are permanently bonded to adjacent faces of the skins. The core comprises a reticulated or honeycomb construction presenting a plurality of open-ended cells, the walls of which extend substantially normal to the skins and thus stabilize the same.

Such laminates have been heretofore proposed but could not be used where a structural element having good thermal insulation properties was required, for it was found that the honeycomb core by itself had a "K" factor only slightly lower than that of solid lumber. The laminate of the present invention, however, has a relatively low "K" factor and is particularly useful in all applications where a structural panel or the like having good thermal insulating properties is required. Although the "K" factor of the panel of the present invention is relatively low, the weight of the panel has not been increased so that the panel is highly useful in the transportation fields where premiums can be paid for weight saved.

The "K" factor of the honeycomb of the panel herein described is made lower than that of prior honeycomb structures by treating the walls of the cells of the core in such a manner that the surfaces thereof act as heat absorbing surfaces. This can be brought about by several means, although the most economical means consists in applying to the material of the core a pigment, or the like, to the end that the walls of all cells act as "black bodies" and absorb a relatively high percentage of all radiant heat introduced into the panel.

Where paper is used to form the core the means used to form "black bodies" of the cell walls can be added to the solution selected to impregnate the paper to the end that the heat absorbing surfaces are produced at the time the paper is impregnated to increase its weathering properties.

Heat absorbing surfaces may also be produced by applying to selected areas of the material forming the cell walls some suitable material. This material preferably should also be such that the cell walls to which the same is applied will form "black bodies." The material may be some suitable flocculent material which is black in color. The black flocculent material will not only present heat absorbing surfaces within the cells of the core, but also increase surface frictional resistance to convection currents within each cell and thus further reduce heat transfer across the core. The flocculent material, as will be understood, also increases the sound absorbing properties of the panel of the present invention which is inherently produced by the plurality of cells of the core of the panel.

To further reduce radiation losses in the panel of the present invention, reflecting surfaces are formed at the bond or jointure between the skins and the core. This results in a two-fold advantage, for the skin of the higher temperature is thus made a poor radiator, while the surface of the other skin will reflect a large portion of the radiant heat incident thereon back into the core.

In the embodiment of the invention illustrated, the reflecting surfaces are formed by incorporating into the bonding agent used to secure the skins to the core a material having a relatively high reflectivity. The material incorporated into the bonding agent may consist of aluminum powder or flakes and should be present in the bonding agent in sufficient quantities to insure that high reflective surfaces will be formed when the skins are bonded to opposite surfaces of the core.

The reflecting surfaces can be also directly formed on the skins by polishing selected surfaces thereof and using a transparent bonding agent to secure the skins to the core member. Furthermore, a bonding agent could be selected which had the characteristics of forming a relatively high reflective surface after it had set and hardened.

Other features and advantages of the panel of the present invention will be apparent from the following description taken in connection with the accompanying drawing in which.

Figure 1:
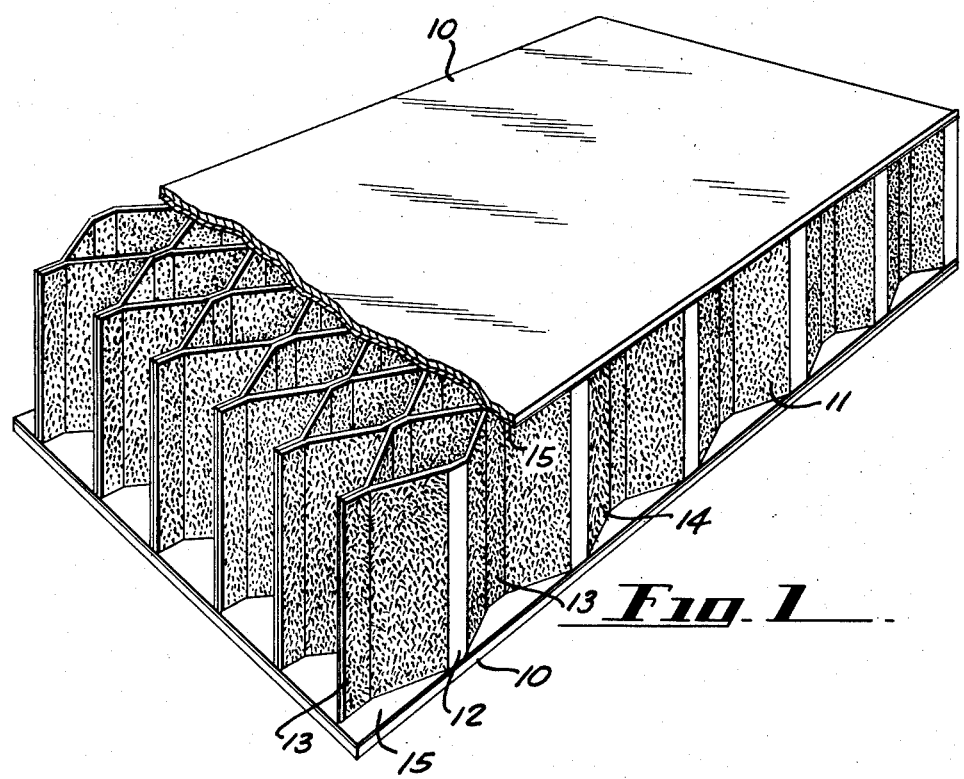
Figure 1 is a perspective view of one embodiment of the panel with a portion of the one skin broken away to more fully illustrate the interior of the core.
Figure 2:
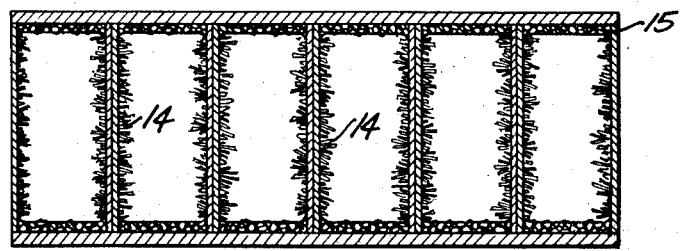
Figure 2 is an elevational view of a narrow section removed from the panel of Figure 1.

One embodiment of the panel of the present invention, referring now to the drawing and more particularly to Figures 1 and 2 thereof, comprises a pair of skins formed as sheet members or plates 10 between which is sandwiched a multi-cell core element 11. The core element, in the broadest aspects thereof, comprises a reticulated member having a plurality of open-ended cells the walls of which extend normal to the plates and thus resist loads laterally applied to the panel.

A number of methods can be used to form the core which in the illustrated embodiment of the invention comprises a plurality of strips of flexible material such as paper, each strip connected to one of the adjacent strips at suitably spaced lines of jointure 12 and to the other adjacent strip along lines of jointure 13. It will be seen that the lines of jointure 12 are staggered with respect to lines of jointure 13, preferably by an amount substantailly equal to one half of the distance between adjacent lines of jointure 12 and 13.

The lines of jointure may be formed by applying lines of some suitable adhesive to opposite surfaces of the individual strips of paper with the lines of adhesive on one surface of each strip staggered relative to the lines of adhesive applied to the opposite surface of the strip. The strips may then be superimposed one on the other to secure the same together along the lines of adhesive. The product thus formed after the adhesive has been set can be expanded to form the reticulated core shown in Figure 1 having a plurality of staggered rows of cells, the walls of which extend normal to the outer faces of the core.

The core may also be formed by applying to opposite faces of a single moving web of flexible material longitudinally extending lines of adhesive with the lines of one face laterally spaced in staggered relationship to the lines on the other face of the web. The web may then be fan folded to form a compact fan folded mass, the individual folds of which are adhesively secured together along lines of jointure established by the lines of adhesive applied to the web. By a suitable cutting or grinding operation, the edges of the interconnected folds can be separated to produce a product which can be expanded as in the first described method of forming the core.

The core, either during the expanding operation or subsequent thereto, is impregnated with some suitable material to render the core impervious to moisture and to strengthen the material of same. It is now preferred to impregnate the material of the core with a thermo-setting phenolic resin, although other materials can be used to bring about the end result desired.

The material used to form the core should be one which has a relatively low thermal conductivity. As the walls of the cells formed are relatively thin, it will be seen that very little heat will be transmitted by conduction across the core. Although the cells form dead air spaces between the plates 10, heat energy will be transmitted from one plate to the other by radiation. The present invention is concerned with reducing losses brought about by radiation, and it will be shown that in the panel of the present invention a substantial reduction of heat transmission by radiation is accomplished.

Regardless of which method is used to form the core, in the embodiment of the invention shown in Figures 1 and 2, relatively wide bands of flocculent material 14 are secured to opposite surfaces of either the individual strips prior to the step of bonding the strips together in the one method, or the web prior to fan folding the same in the other suggested method. The flocculent material may be applied by first coating selected areas of the strips or web, depending on the method used to form the core, with a suitable adhesive and then bringing the flocculent material into contact with the adhesive before the same is set. Thus, when the pack is expanded, the surface of the walls of each cell so formed are covered with the flocculent material. It has also been found that the flocculent material can be introduced into the cells just subsequent to the impregnation step for the impregnating material can be used as the agent for adhering or bonding the flocculent material to the walls of the cells.

Any flocculent material can be used, although it is now preferred to use shredded asbestos or some similar fibrous material. Whatever flocculent material is used, it is now preferred to so color the same that the surfaces presented by the walls so covered will act as "black bodies" and will absorb a relatively high percentage of all radiant heat introduced into the panel to reduce heat transmission therethrough. The flocculent material, furthermore, will reduce reflective properties of the walls of the cells and thus further reduce heat transmission through the panels.

As is well known, most of the heat passing through one of the plates 10 will radiate outwardly at all angles. Therefore a very high percentage of the radiations will strike the walls of a given cell before reaching the opposite plate 10. The "black" surfaces of the cell walls will absorb most of these radiations and very little heat will be reflected angularly on toward the opposite plate 10. Since the rate of heat flow from end to end of a cell wall is fixed and relatively low, the result is that the total heat flow to the opposite plate 10 is very greatly reduced.

Although the cells are relatively small, the density of the air held by the cells varies because of the temperature differences of the air at opposite ends of the cells. This difference in densities, as will be understood, sets up convection currents in each cell, resulting in some heat transmission by convection through the panel. Convection losses in the embodiment of the panel shown in Figures 1 and 2 are reduced by the flocculent material as the irregular surface presented by same increases the surface friction in each cell and, by thus increasing the resistance to the flow of air, reduces convection currents.

The plurality of cells of the core inherently impart to the same relatively good sound absorbing properties. The flocculent material applied to the walls of the cell further increases the sound absorbing porperties of the core to the end that the same are relatively high. This feature of the panel of the present invention renders the same extremely suitable for wall elements where sound absorbing properties are necessary or desirable.

Figure 3:
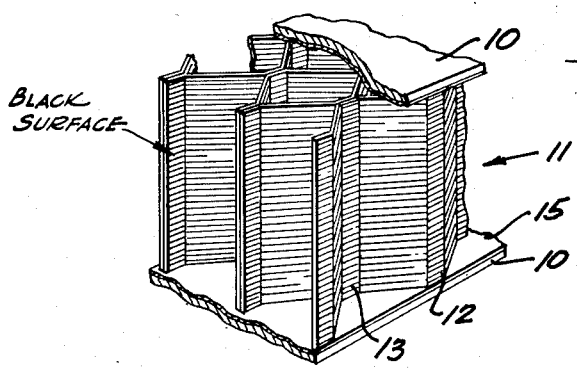
Figure 3 is a fragmentary perspective view of another embodiment of the panel of the present invention.

In the embodiment of the invention shown in Figure 3 which is formed in the identical manner as is the earlier described form of the invention, although no flocculent material is applied to the walls of cells, the same nevertheless have a relatively high heat absorptivity. This is so as the walls of the cell are formed as "black bodies" for the same are substantially black in color. The material of the core may be colored black by any means desired. For example, the material may be dyed or colored black before it is assembled to form the core, or a black pigment can be applied to the material while the core is being assembled, or even subsequent to its assembly formation. If desired, a suitable pigment or color can be incorporated into the impregnating solution so that the material of the core is colored black while the material is being impregnated.

Regardless of how or when the pigment is applied to the surface of the walls of the cells, the same have a relatively high absorptivity and a low reflectivity, and, in this form of the present invention as in the earlier described embodiment of the invention, the transmission of radiant heat across the panel is greatly reduced.

The term "black body" as used herein is to be understood as applying to any surface which is dark enough or dull enough, or both, to absorb a relatively large percentage of the radiant heat incident thereon.

It is believed clear that in both forms of the invention illustrated, the absorption of radiant energy by the walls of the cell will reduce the total heat transmitted across the core, for heat absorbed by the cell walls will be transmitted to the outer panel by conduction only. As the walls of the cells will conduct only so much heat per unit of time, less total heat will be conducted by the cell walls because of the absorption of radiant heat by the same, and the transmission of the heat absorbed through the walls by conduction.

To further reduce radiant heat transfer across the core, reflecting surfaces are formed at the jointure between the skins or plates 10 and the opposite surface of the core 11. Although such surfaces may be formed by any suitable means, it is now preferred to form these reflecting surfaces by incorporating into the bonding agent used to bond the skins or plates to the opposite surfaces of the core a material having a relatively high reflectivity, so that after the bond between the skins and the core have been effected, the exposed surfaces of the bonding agent carried by the skins are reflective.

In forming the panel of the present invention, after the walls of the core have been rendered heat absorbing, a suitable bonding agent 14 carrying the reflective material is applied to the entire surface of one face of each skin 10, whereupon the skins are arranged on opposite sides of the core 11 and the coated faces of the skins are brought into engagement with opposite surfaces of the core. The bonding agent 15 is preferably a thermo-setting phenolic resin, and the bond between the skins and the core is completed under heat and pressure.

Although any material which will bring about the result desired can be added or incorporated into the bonding resin, it is now preferred to use either aluminum powder or flakes. Aluminum, as it is highly resistant to corrosion, is admirably adapted for this use, for it retains its reflective properties even after relatively long periods of use. The aluminum should be present in the bonding agent in sufficient quantity to insure that a good reflecting surface will be formed after the agent has set and hardened.

The reflecting surfaces formed serve a twofold purpose, for the resin carried by the skin of the higher temperature presents a reflecting surface which renders that skin a poor radiator. The emissivity of the skin of the higher temperature is thus reduced, which results in a reduction in heat energy radiated by that skin.

The reflecting surface presented by the resin carried by the other skin will, as should be understood, reflect back into the core a substantial portion of all radiant heat incident thereon. Thus heat energy transmitted by radiation from one skin to the other of prior panels is considerably reduced in the panel of the present invention. As a large part of the heat lost in the panels of like construction previously proposed is prevented from being radiated through the panel of the present invention, the latter has a relatively high thermal insulation property and a relatively low "K" factor.

In both embodiments of the invention illustrated, it is obvious that the reflecting surfaces could be directly formed on the skins by polishing selected faces thereof and using a transparent bonding agent to secure the skins to the core member. Furthermore, a bonding agent could be selected which has the characteristic of forming a relatively high reflective surface after it has set and hardened.

In each of the forms of the invention illustrated, as the cell walls support entropy-arrestive material and as the reflecting surfaces inhibit radiant heat losses, the resulting panel has a relatively low "K" factor, and thus lends itself to any use in which a thermally insulated structure is required or desired. As the means used to reduce heat transmission across the panel does not materially increase the weight of the panel, the same is particularly useful in the transportation fields where weight is a factor.

Although the now preferred embodiments of the present invention have been illustrated and described herein, it is to be understood that the invention is not to be limited thereto, for the same is susceptible to changes in detail and form within the scope of the appended claims.

We claim:

1. A structural panel of the type described, comprising: a reticulated core having a plurality of open-ended cells extending substantially normal to the opposite faces of said core; pigmented, flocculent material carried by the walls of said cells forming heat absorbing surfaces thereon; plates extending across the opposite faces of said core and bonded thereto; said plates closing the open ends of said cells to provide a plurality of dead air spaces within said core; and reflecting surfaces formed on the inner faces of said plates to provide a reflecting end-closing wall for each cell facing inwardly thereof.

2. A structural panel of the type described, comprising: a reticulate, low thermal conducting core having a plurality of open-ended cells extending substantially normal to opposite faces of said core; flocculent material black in color carried by the walls of said cells for absorbing radiant heat introduced into said cells; a plate disposed across each of the opposite faces of said core; means for bonding said plates to said opposite faces and closing the open ends of said cells; and reflective particles carried by said bonding means forming reflecting surfaces facing inwardly of each cell at opposite ends thereof.

3. A structural panel of the type described, comprising: a reticulate core having a low thermal conductivity and presenting a plurality of open-ended cells extending substantially normal to the opposite faces of said core; pigmented, flocculent material carried by the walls of said cells forming heat-absorbing surfaces thereon; and means for bonding a plate to each of the opposite faces of said core; said bonding means forming reflective surfaces on the inner faces of said plates at the opposite ends of said cells for inhibiting radiant heat loss at the one plate and for reflecting radiant heat at the other plate.

4. A structural element of the type described, comprising: a reticulate core formed of a material having a low thermal conductivity, said core having a plurality of open-ended cells extending substantially normal to the opposite faces of said core; pieces of elongate "black-body" material attached to said cell-walls and extending into the cell interiors for absorbing radiant heat introduced into said cells; a pair of plates; and means for bonding said plates to the opposite surfaces of said core, said bonding means having the characteristic of producing a reflective surface so that the exposed areas of the same form, at opposite ends of said closed cells, reflecting surfaces facing inwardly of the core.

5. A structural panel of the type described, comprising: a reticulate core having a low thermal conductivity and presenting a plurality of open-ended cells extending substantially normal to the opposite faces of said core; elongate pieces of flocculent "black-body" material attached to said walls in flocs lying in sufficient mutual separation to define convection-air trapping spaces therebetween so as to minimize the formation of convection-air currents in regions adjacent the cell walls; a pair of plates; and means for uniting said plates to the opposite surfaces of said reticulate core, said uniting means forming reflecting surfaces at the opposite ends of said cells adapted to inhibit radiant heat loss through the one plate and to inhibit reflection of radiant heat at the other plate.

6. A structural panel of the type described, comprising: a reticulate core having a low thermal conductivity and presenting a plurality of open-ended cells extending substantially normal to the opposite faces of said core, the walls of each cell being adapted to define a dead-air space therebetween; elongate pieces of "black-body" material disposed substantially normal to the cell walls and attached at their inner ends thereto and extending across the path of radiant and convection heat through the dead air space in said cells sufficiently to define and frictionally substantially immobilize a substantially central core of air so as to throttle the passage of radiant and convection heat through the cells while leaving the conduction-heat insulating cross-sectional area of said dead air space substantially the same as that of a bare-walled cell of the same stress-taking cross-sectional area; a pair of plates; and means for uniting said plates to the opposite surfaces of said reticulate core, said uniting means forming reflecting surfaces at the opposite ends of said cells which are adapted to inhibit radiant-heat loss through the one plate and to inhibit reflection of radiant heat at the other plate.

BRUCE E. DEL MAR.
PAUL L. SMITH.

REFERENCES CITED

The following references are of record in the file of this patent:

UNITED STATES PATENTS

| Number | Name | Date |
|---|---|---|
| 1,965,636 | Forster et al. | July 10, 1934 |
| 2,001,632 | Schlichting | May 14, 1935 |
| 2,348,703 | Weir et al. | May 9, 1944 |
| 2,389,641 | Sarbach | Nov. 27, 1945 |
| 2,428,979 | May | Oct. 14, 1947 |
| 2,556,470 | Del Mar | June 12, 1951 |